JOSEPH BAYMA. Improvement in Motive Power and Balance Car.
No. 121,316. Patented Nov. 28, 1871.

Witnesses.
Paul Raffo
Geo. H. Strong

Inventor,
Joseph Bayma

UNITED STATES PATENT OFFICE.

JOSEPH BAYMA, OF SAN FRANCISCO, CALIFORNIA.

IMPROVEMENT IN MOTIVE POWER AND BALANCE CARS.

Specification forming part of Letters Patent No. 121,316, dated November 28, 1871.

*To all whom it may concern:*

Be it known that I, JOSEPH BAYMA, of San Francisco, in the county of San Francisco and State of California, have invented an Improved Motive Power and Balance Car; and I do hereby declare that the following is a full and exact description of the same, reference being had to the accompanying drawing and to the letters of reference marked thereon.

The object of my invention is to provide an improved mechanical arrangement which I call "a motive power and balance car;" and it consists mainly in the employment of two wheels of considerable size placed side by side, and sufficiently separated to allow a platform to be placed between them, this platform being supported upon a frame which connects with the axles of the wheels. Cranks are attached to the inner ends of the axles of the wheels, and these are operated by means of treadles or planes which are hinged to the platform. My invention further consists in a novel arrangement of mechanism by which I am enabled to operate either wheel independently of the other without altering the movement of the treadle.

Figure 1:
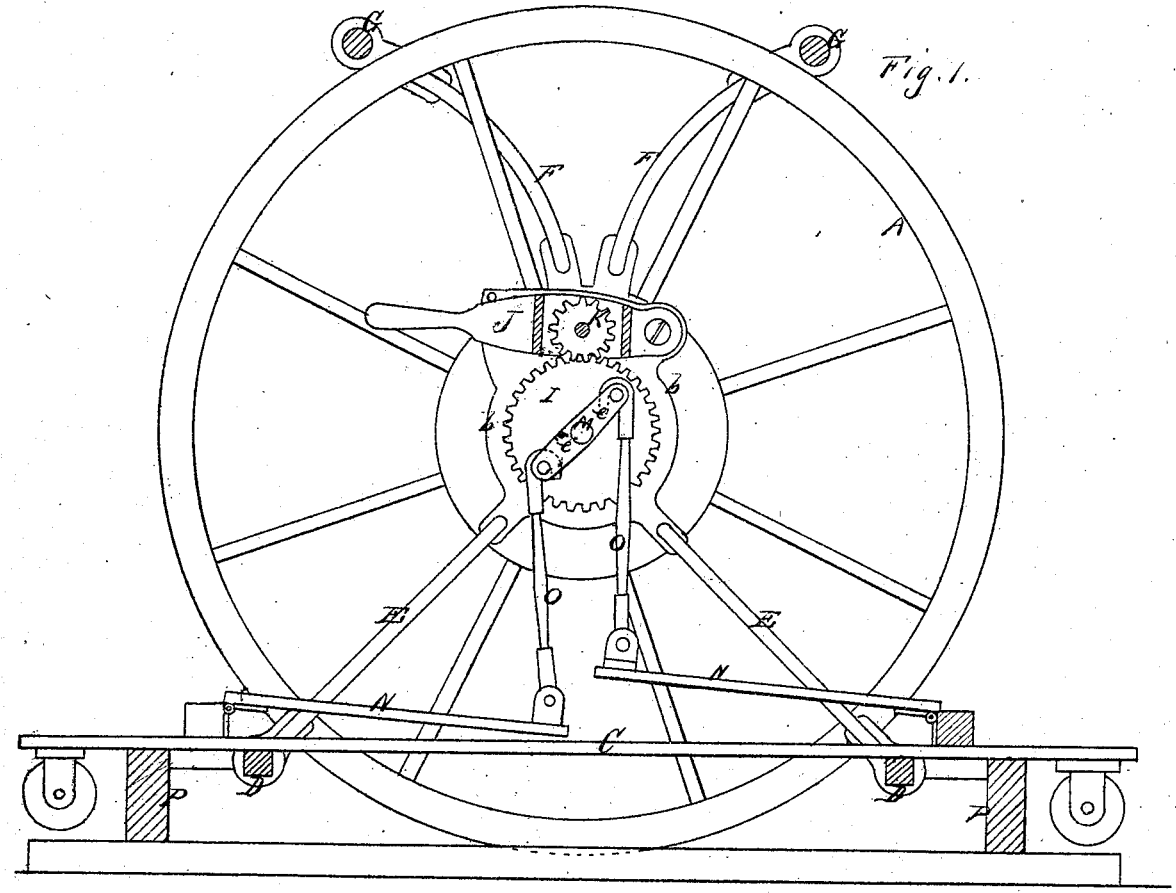
Figure 2:
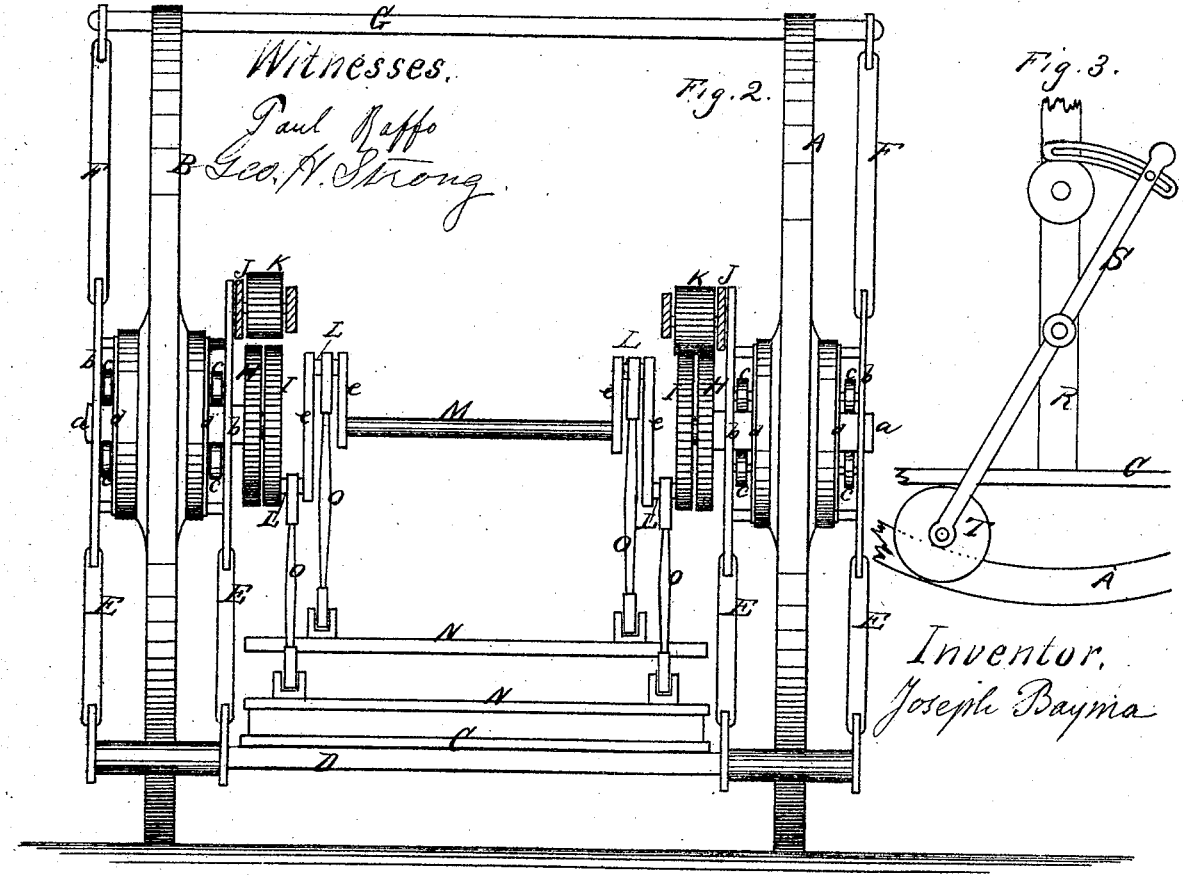
Figure 3:
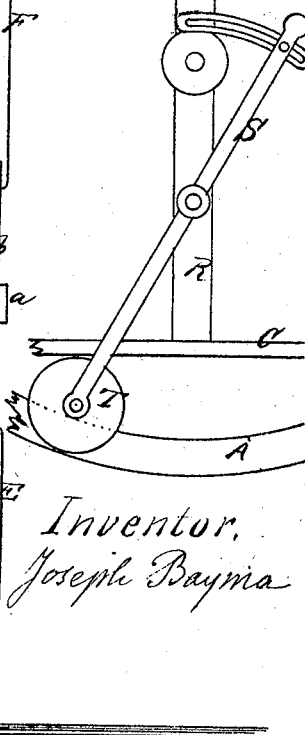

Referring to the accompanying drawing for a more complete explanation of my invention, Figure 1 is a side elevation, Fig. 2 is an end view, and Fig. 3 shows another mode of changing the relative motion of the wheels.

A and B are two wheels of suitable size and construction to be employed either as drivers for machinery or as bearing-wheels, if it be desired to make a vehicle. These wheels are provided with axles $a$ which extend a short distance through the hubs, and either turn in bearings in the plates $b\ b$ or they may rest on friction-rollers $c$, these rollers having their axles supported by the plates $b$ and $d$. The wheels A A are placed with their axles in a line, and sufficiently separated from each other to admit the platform C between them. This platform rests upon the cross-bars D, these bars being connected with the central plate $b$ by rods E. Similar rods F extend upward, as shown, and have cross-bars G extending between them. These bars serve to strengthen the frame and also to support the operator while standing on the treadle. The inner ends of the axles $a$ have gear-wheels H secured to them. These axles are made hollow, and a smaller shaft enters them from the inner end. Another gear-wheel, I, of the same size and number of teeth as the wheel H is secured to this inner shaft so as to lie close against the gear H. This wheel may move independently or with the wheel H by the use of the following device: A short lever, J, is pinned at one end to the plate $b$, the other end being free to move up or down. A pinion, K, long enough to engage the teeth of both the wheels H and I is supported so as to turn near the middle of the lever J, as shown, and when this lever is thrown down both the gear-wheels H and I must turn together, but when it is raised the wheel I will be subject to the motion of the cranks and treadle, while the wheels H, with their bearing-wheels A, will be independent and can stop. Crank-pins L project from the inner faces of the gear-wheels I, and double cranks $e\ e$ are formed in the usual manner, as shown. These cranks may have a shaft, M, extending between them, if found necessary for steadiness, or it may be omitted. Inclined planes or treadles N N are hinged to the platform C, so that their free or working ends are close together near the center. These treadles are connected with the cranks $e\ e$ by connecting-rods $o$, so that when the operator stands upon the treadles he turns the cranks by alternately throwing his weight upon one treadle and the other.

When the machine is to be used for traveling, the wheels A and B rest upon the ground, the platform C swinging between them. A small caster-wheel may be placed at each end of the platform to prevent its striking the ground while moving. The treadles and cranks will operate upon both the wheels A and B equally as long as the pinions K are made to mesh into the gear-wheels H and I; but if either pinion be thrown out of gear by raising its lever the wheel A or B on that side will cease to be acted on, and thus the machine may be turned in any direction. Another device for turning is shown at Fig. 3, where the standard R extends straight down from the axle and an arm, S, is pinned to it so as to have a motion to one side, as shown. This arm carries a small wheel, T, on its lower end, and this may be brought in contact with the ground by moving the arm so as to uplift the adjacent main wheel, and thus cause the machine to turn in that direction, the gearing being dispensed with.

If it be desired to use the power to drive machinery, the ends of the platform C can be raised so as to rest upon blocks P, when the wheels A B will turn freely, and may be made to transmit their power by the means of belts or other suitable device.

Having thus described my invention, what I claim, and desire to secure by Letters Patent, is—

1. The treadles N N hinged to the platform C and the cranks $e\ e$ and connecting-rods O, together with the wheels A and B, when the whole is constructed to operate substantially as described.

2. The device, consisting of the gear-wheels H and I, mounted independently, as shown, and the pinion K with its operating-lever J, constructed and operating substantially as herein described.

In witness whereof I have hereunto set my hand.

JOSEPH BAYMA.

Witnesses:
   GEO. H. STRONG,
   P. RAFFO.

(67)